United States Patent [19]
Workinger et al.

[11] Patent Number: 5,338,617
[45] Date of Patent: Aug. 16, 1994

[54] RADIO FREQUENCY ABSORBING SHIELD AND METHOD

[75] Inventors: David M. Workinger, Mesa; Robert D. Fraser, Tempe, both of Ariz.

[73] Assignee: Motorola, Inc., Schaumburg, Ill.

[21] Appl. No.: 983,210

[22] Filed: Nov. 30, 1992

[51] Int. Cl.5 .............. B22F 3/00; B22F 5/00; H01Q 17/00
[52] U.S. Cl. ................ 428/551; 419/30; 419/33; 419/35; 241/3; 342/1
[58] Field of Search ........... 419/30, 35, 36, 37, 419/64, 65, 33; 428/570, 551; 342/1; 241/3, 15, 14, 16, 17, 18

[56] References Cited

U.S. PATENT DOCUMENTS

| | | | |
|---|---|---|---|
| 4,011,360 | 3/1977 | Walsh | 428/402 |
| 4,367,306 | 1/1983 | Maeda et al. | 524/411 |
| 4,474,685 | 10/1984 | Annis | 252/503 |
| 4,596,670 | 6/1986 | Liu | 252/511 |
| 5,061,566 | 9/1991 | Morgan | 428/423.1 |
| 5,103,103 | 4/1992 | Radford et al. | 250/515.1 |

OTHER PUBLICATIONS

L. G. Wade, *Organic Chemistry*, 1987, pp. 1284–1303.

*Primary Examiner*—Donald P. Walsh
*Assistant Examiner*—Anthony R. Chi
*Attorney, Agent, or Firm*—Frederick M. Fliegel

[57] ABSTRACT

A method for insulating metal powder particles comprises steps of placing the metal powder particles in a mixing container and adding a monomer in solution to the metal powder particles to form a mixture. The mixture is then stirred to provide an even consistency and is baked to remove solvents. The mixture is then stirred and the monomer is polymerized by exposing the monomer coated carbonyl iron particles to moist gas. The mixture is then ground to form a powder. The powder is suitable for incorporation into plastic resins for subsequent casting to form radio frequency shields having high DC resistance.

20 Claims, 2 Drawing Sheets

RADIO FREQUENCY ABSORBING SHIELD AND METHOD

The U.S. Government has a paid-up license in this invention and the right in limited circumstances to require the patent owner to license others on reasonable terms as provided for by the terms of Contract No. N00024-91-C-5308 awarded by the United States Navy.

FIELD OF THE INVENTION

This invention relates in general to the field of radio frequency absorbing shields, in particular to shields comprising plastic materials and more particularly to conductively loaded plastic shields.

BACKGROUND OF THE INVENTION

Radio frequency shielding is important for many electronic products requiring freedom from covert observation and/or to prevent interference in radio frequency apparatus caused by signals irradiating the apparatus. Examples of such equipment include secure telephony apparatus (e.g., telephones, facsimile machines, data logging and reporting devices and the like) for encrypted communication, high-security computers and electronic apparatus for metrology (e.g., electronic equipment for performing sensitive measurements, medical electronic equipment, electronic equipment for regulating explosive and/or toxic materials).

Full duplex radio-telephones and some types of compact radars, such as those employed for collision avoidance radars on vehicles and those employed for fuzing of shells, bombs and/or missiles, employ transmitting and receiving antennae in close proximity to one another. In these equipments, it is extremely desirable to shield the receiving antenna from the signal emitted from the transmitting antenna.

Metal shields are inconvenient for many applications because they do not provide high DC resistance and also because metal components are not as readily cast or shaped as many plastics are.

One method for realizing radio frequency shields of a type compatible with modern electronic equipment manufacturing practices is to modify the radio frequency properties of a plastic material suitable for molding, for example, to form an enclosure for a piece of electronic gear. Such modification may be achieved by "loading" a plastic material with finely divided conductive particles, for example, finely divided or powdered metals. In many applications, it is necessary to insulate the particles from one another to provide the desired radio frequency absorption profile and/or the desired DC conductivity characteristics. Carbonyl iron powders provide some of these characteristics, however, the resistance between grains in carbonyl iron powders may vary from lot to lot.

Some techniques for insulating conductive particles such as carbonyl iron utilize plasma processes requiring substantial capital equipment investment and which are poorly suited to low volume production of the insulated particles. In these processes, carbonyl iron is mixed with a vapor of a polymeric material which is then polymerized by application of radio frequency energy.

Another process which has been employed involves treating the carbonyl iron with phosphoric acid to oxidize the surfaces of the particles, thereby insulating the particle surfaces. This process can be unreliable and may provide decreased insulation and/or decreased resistance in some cases.

What is needed is a radio frequency absorptive plastic material which is easily and reliably produced, is readily adaptable to specific requirements, and is effective in absorption of radio frequency energy.

SUMMARY OF THE INVENTION

Accordingly, there is provided a new and improved apparatus for radio frequency shielding comprising a molded plastic, the plastic including a resin and insulated metallic particles. The apparatus desirably but not essentially includes insulated metallic particles comprising carbonyl iron particles.

The apparatus further desirably but not essentially includes insulated metallic particles comprising a coating of polymerized monomer, wherein the monomer has been dissolved in a solvent and thoroughly mixed with metallic particles and has been subsequently heated to remove the solvents and polymerized to provide the insulated metallic particles. The apparatus further desirably but not essentially includes carbonyl iron particles having diameters of less than six micrometers.

Accordingly, there is further provided a new and improved method for insulating metal powder particles comprising steps of placing the metal powder particles in a mixing container, adding monomer solution to the metal powder particles to form a mixture and stirring the mixture to provide an even consistency. The method further comprises steps of baking the mixture to remove solvents, stirring the mixture to break the surface of the mixture, polymerizing the monomer, and grinding the mixture to form a powder.

The method desirably but not essentially includes a step of adding a solution of room temperature vulcanizing (RTV) silicone rubber dissolved in a solvent and having a solids content of 10% or more, the solvent consisting of elements chosen from the group consisting of hexane, toluene, acetone, isopropanol, ethanol, methanol and mineral spirits.

The method desirably but not essentially includes a step of polymerizing the the monomer by treating the mixture with a gas having at least 40% relative humidity for a period of at least one-half of an hour. The method desirably but not essentially includes a step of adding a solution of epoxy monomer dissolved in a solvent and having a solids content of more than 5% and preferably about 10% or more, the solvent selected from the group consisting of hexane, toluene, acetone, isopropanol, ethanol, methanol and mineral spirits.

A communications apparatus comprises a receiving antenna, a transmitting antenna and a shield separating the antennae. The shield includes insulated metal particles and a plastic matrix containing said insulated metal particles. The communications apparatus desirably but not essentially includes insulated metal particles comprising carbonyl iron particles. The communications apparatus desirably but not essentially includes insulated metal particles comprising metal particles coated with a monomer which is then polymerized.

BRIEF DESCRIPTION OF THE DRAWING

A more complete understanding of the present invention may be derived by referring to the detailed description and claims when considered in connection with the figures, wherein:

DETAILED DESCRIPTION OF THE PREFERRED EMBODIMENTS

Applicants have discovered that carbonyl iron having particle diameters of less than six micrometers is particularly well suited to forming "loaded" plastic materials having radio frequency absorption in the range from 1.5 to 13 gigaHertz when it is additionally required that the carbonyl iron particles must be insulated from one another in order to provide high DC resistance properties. A representative example of desired attenuation characteristics is provided in TABLE I below.

| FREQ. | (GHz) | 1 | 1.69 | 2.5 | 3 | 8.5 | 13.6 |
|---|---|---|---|---|---|---|---|
| ATT. | (dB/cm) | 2.97 | 6.72 | 10.9 | 13.8 | 39.3 | 54.3 |

TABLE I. Representative attenuation characteristics versus frequency for a carbonyl loaded plastic material.

Typically, DC resistances exceeding $10^6$ Ω are desired in many applications, however, requirements may necessitate resistances as high as $10^8$ Ω, $10^{10}$ Ω or more or as low as $10^3$–$10^4$ Ω.

Applicants have further discovered that a convenient method for reliably preparing insulated metal particles of appropriate size comprises coating metal particles with a monomer solution followed by polymerization of the deposited monomer and subsequent separation of the coated particles from one another.

Figure 1:
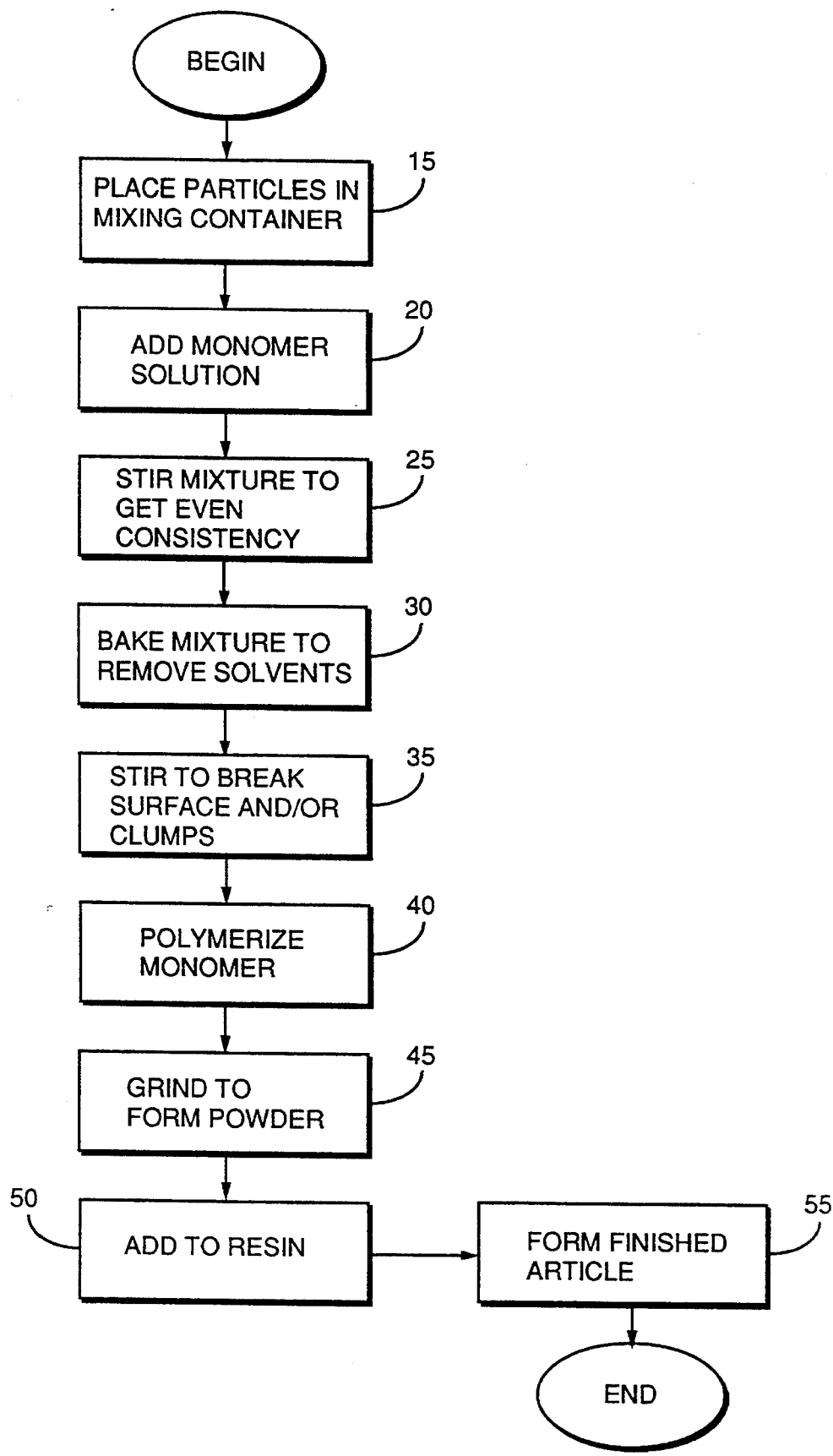
FIG. 1 illustrates a flowchart of steps for coating metal powder particles in accordance with the present invention.

FIG. 1 illustrates a flowchart of steps for coating metal powder particles in accordance with the present invention. The method comprises steps of placing the metal powder particles in a mixing container (block 15) and adding a solution comprising a monomer dissolved in a solvent to the metal powder particles to form a mixture (block 20). The method further comprises steps of stirring the mixture to provide an even consistency (block 25) and then baking the mixture to remove solvents (block 30). The mixture is then stirred to break the surface of the mixture (block 35) and the monomer is polymerized (block 40). The mixture is then ground to form a powder (block 45). The mixture may then be added to a resin (block 50) and cast or extruded to form a conductively loaded plastic (block 55).

Several techniques and materials were found to provide particles having appropriate DC and RF properties.

EXAMPLE I

A series of six samples and an untreated control were prepared as follows. 50 grams of carbonyl iron (GAF lot 90319, available from ISP (GAF) Corp., 1361 Alps Road, Wayne, N.J.; or from BASF Wyandotte Corp., 100 Cherry Hill Road, Parsippany, N.J.) was treated with either 7 or 10 grams of DC-1200, DC-1205 (Dow Corning, Midland, Mich.) or GE-4155 (General Electric, Waterford, N.Y.) silicone primers for room-temperature vulcanizing silicone rubbers (comprising solutions of monomers in appropriate solvents) by placing the carbonyl iron in a mixing container and adding monomer solution (primer) to the carbonyl iron in the specified quantity. DC-1200 RTV prime coat comprises 85% light aliphatic petroleum naptha, 5% tetra (2-methoxyethoxy) silane, 5% tetra propyl orthosilicate and 5% tetra butyl titanate, where all percentages are given as weight percentages and all mixtures/solutions are prepared in accordance with principles well known in the relevant arts. The mixture was stirred for thirty to forty-five seconds to provide an even consistency. The mixture was then placed in an oven which had been pre-heated to a temperature desirably in the range of from about 60° C. to about 80° C. and preferably about 65° C. for about an hour to remove solvents.

A lower temperature must be sufficient to cause the solvents to evaporate within the specified time while an upper temperature should not cause chemical changes in the monomer or pose safety hazards (e.g., be above the flash point of the solvent). The time should be sufficient to remove the solvent from the mixture at the chosen temperature.

The dried mixture was then removed from the oven and stirred to break the surface of the mixture and subsequently allowed to stand at room temperature and 50% relative humidity for at least one hour to polymerize the monomer coating the carbonyl iron powders. The relative humidity in which the dried mixture is placed should exceed 40% and may be greater than 50%. The mixture was then ground into a powder by, for example, placing the mixture in a mortar and grinding it with a pestle.

A mixture comprising 10 parts by weight of Hysol 2038 resin epoxy, 3 parts by weight of Hysol HD 3561 epoxy hardening catalyst and 75 parts by weight of the plasticized carbonyl iron was then prepared and cast in accordance with manufacturers' specifications. The casting was cured at a temperature of 65° C. for two hours at a pressure of 40 pounds per square inch in a pressure tank. The mold comprised a cylindrical opening approximately 0.38 inch in diameter and approximately 0.38 inch tall in a metal plate to provide a cylindrical carbonyl-loaded epoxy plug having a piece of 18 gauge wire placed therewithin along the cylinder axis. The finished plastic test pieces were then electrically tested to determine the current passing between the wire and the plate when a constant voltage is applied to provide characteristic DC resistance values. Typical testing voltages are 40 and/or 250 Volts.

In an alternative testing technique, cylindrical carbonyl-loaded plastic plugs approximately one-fourth of an inch high and between one and one and one-half inches in diameter having two wires embedded therein spaced one-fourth of an inch apart and extending across the diameter of the plugs are prepared. The finished plastic test pieces are then electrically tested to determine the current between the two wires when a constant voltage is applied to provide characteristic DC resistance values.

Because of heating and breakdown effects due to the high resistances of the samples, such measurements are typically made at a specific time after the voltage is applied. The results of these measurements are summarized in TABLES II and III below. In TABLES II through V, all values are given in Ohms as a mantissa followed by a power of ten in parentheses.

Comparison of the resistances in TABLES II and III shows that the samples treated with DC-1205 (10% solids content) and GE-4155 (10% solids content) monomer solutions all show substantial increases in resistance, with the −1 samples showing higher resistivity than the −2 samples. The samples treated with DC-1205 and GE-4155 all meet or exceed the desired parameters. The samples treated with DC-1200 (4% solids content) do not meet the DC resistance requirements for this particular application.

| SAMPLE | SAMPLE NO. 1 | 2 | 3 | AVERAGE |
|---|---|---|---|---|
| UNTREATED | 5.9(8) | 3.7(8) |  | 4.8(8) |
| 1200-1 | 4.3(8) | 8.1(8) | 7.0(7) | 5.2(7) |
| 1200-2 | 3.5(8) | 1.8(7) | 1.6(8) | 7.7(8) |
| 1205-1 | 2.5(11) | 1.7(12) | 1.0(11) | 1.2(11) |
| 1205-2 | 9.7(10) | 4.1(10) | 5.0(10) | 6.2(10) |
| 4155-1 | 5.5(11) | 4.5(11) | 4.4(11) | 4.8(11) |
| 4155-2 | 1.8(11) | 8.9(10) | 1.0(11) | 3.1(10) |
| ACETIC | 2.1(7) | 4.3(6) |  | 2.3(6) |

TABLE II. Measured resistances for plastics loaded with 50 grams of carbonyl iron (GAF lot 90319) treated with monomer solutions, in this case DC-1200, DC-1205 and GE-4155 silicone primers, taken 5 seconds after voltage was applied. Suffixes −1 and −2 refer to samples treated with 10 and 7 grams of monomer in solution, respectively.

DC-1205 monomer solution comprises toluene 40%, propylene glycol methyl ether 39%, ethylene glycol butyl ether acetate 15%, epoxy resin 4% and 2-methoxypropanol 1%, where all percentages are weight percentages. GE-4155 comprises ethylorthosilicate 26% and tetrabutyltitanate 6.5%, dissolved in mineral spirits 65%.

| SAMPLE | SAMPLE NO. 1 | 2 | 3 | AVERAGE |
|---|---|---|---|---|
| UNTREATED | 3.4(8) | 3.4(8) |  | 3.4(8) |
| 1200-1 | 4.3(8) | 7.0(8) | 7.0(7) | 4.8(7) |
| 1200-2 | 3.4(8) | 1.6(7) | 1.6(8) | 7.1(8) |
| 1205-1 | 2.9(11) | 2.7(12) | 1.1(11) | 1.4(11) |
| 1205-2 | 1.0(11) | 4.3(10) | 5.6(10) | 3.3(10) |
| 4155-1 | 7.1(11) | 6.3(11) | 5.8(11) | 6.4(11) |
| 4155-2 | 2.8(11) | 1.3(11) | 1.4(11) | 1.6(11) |

TABLE III. Measured resistances for the samples of TABLE II taken 30 seconds after voltage was applied.

EXAMPLE II

A second experiment was performed in which 70 grams of carbonyl iron (GAF lot 100711) was treated with either 14, 9.8 or 21 grams of monomer in solution, in this case DC-1205 or GE-4155 silicone primers, by placing the carbonyl iron in a mixing container and adding monomer solution to the carbonyl iron in the specified quantity. The samples were processed similarly to those of Example I (supra) and the results are summarized in TABLES IV and V below.

| SAMPLE | SAMPLE NO. 1 | 2 | 3 | AVERAGE |
|---|---|---|---|---|
| UNTREATED | 3.5(4) | 4.6(4) | 2.4(4) | 4.0(4) |
| 1205-1 | 9.9(11) | 2.7(12) | 6.2(11) | 5.5(11) |
| 1205-2 | 1.7(12) | 6.4(11) | 9.8(11) | 5.5(11) |
| 1205-3 | 1.0(10) | 3.3(9) | 6.9(11) | 1.2(9) |
| 4155-1 | 4.8(10) | 3.8(10) | 5.4(10) | 4.7(10) |
| 4155-2 | 5.7(10) | 1.1(11) | 6.0(10) | 4.0(10) |

TABLE IV. Measured resistances plastics loaded with for 70 grams of carbonyl iron (GAF lot 100711) treated with monomer solutions, in this case DC-1205 and GE-4155 silicone primers, taken 5 seconds after voltage was applied. Suffixes −1, −2 and −3 refer to samples treated with 14, 9.8 or 21 grams of monomer solution, respectively.

| SAMPLE | SAMPLE NO. 1 | 2 | 3 | AVERAGE |
|---|---|---|---|---|
| UNTREATED | 3.5(4) | 4.6(4) | 2.4(4) | 4.0(4) |
| 1205-1 | 1.5(12) | 3.3(12) | 1.2(12) | 2.0(12) |
| 1205-2 | 2.1(12) | 7.8(11) | 1.5(11) | 3.2(11) |
| 1205-3 | 1.5(12) | 2.1(10) | 1.0(12) | 7.1(11) |
| 4155-1 | 5.8(10) | 4.7(10) | 6.6(10) | 5.7(10) |
| 4155-2 | 8.2(10) | 1.5(11) | 8.0(10) | 5.5(10) |

TABLE V. Measured resistances for the samples of TABLE IV taken 30 seconds after voltage was applied.

Comparison of the results summarized in TABLES IV and V shows that the samples treated with either DC-1205 or GE-4155 primers provide acceptable DC properties while the untreated control sample does not. The samples treated with DC-1205 provide approximately one order of magnitude higher resistivity than do the samples treated with GE-4155. Both monomer solutions provided at least six and in many cases nine orders of magnitude of improvement in the measured DC resistance.

The monomer employed may be selected from the group consisting of liquid polyester resin and silicone rubber. Similarly, the coated conductive particles may be combined with thermosetting or thermoplastic materials including olefins, fluoroplastics, polyamides, polyesters, silicone rubber, urethane, acrylics and/or polycarbonates to provide an article made from conductively loaded plastic material.

Figure 2:
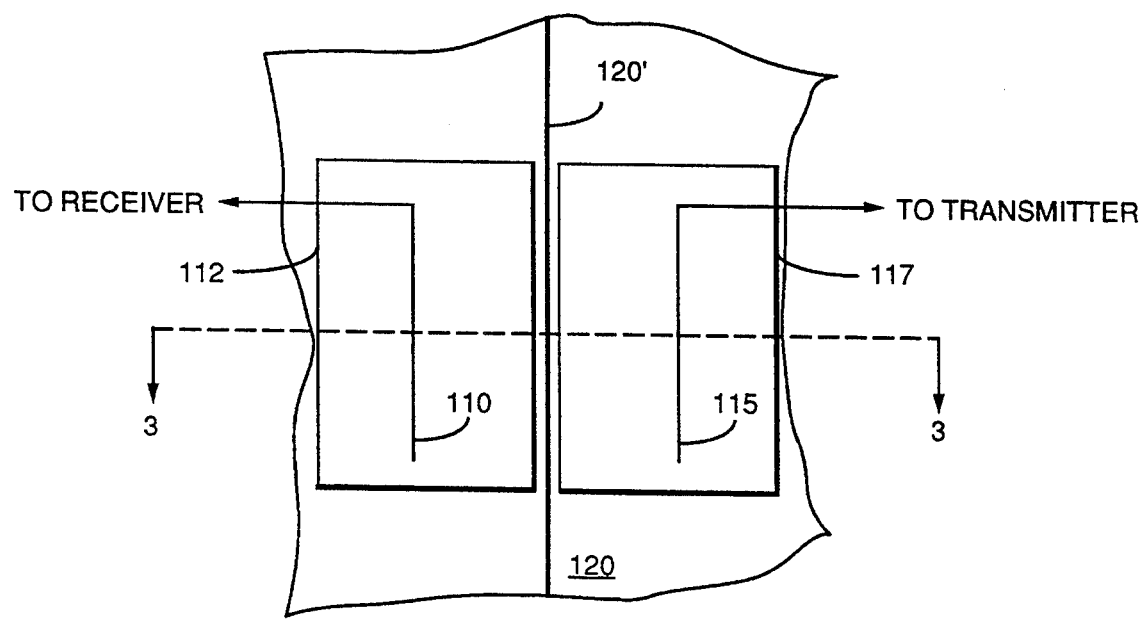
FIG. 2 illustrates a radio frequency assembly for an electronic apparatus in accordance with the present invention.

FIG. 2 illustrates radio frequency assembly 105 for an electronic apparatus (not shown) comprising a receiver (not shown) and a transmitter (not shown) in accordance with the present invention. The electronic apparatus may comprise a communications device, computing apparatus, ranging device (e.g., collision avoidance radar for a vehicle or fuzing device) or measurement instrument. Radio frequency assembly 105 is formed by preparing carbonyl iron as described hereinabove, mixing the carbonyl iron with plastic resin, for example, and molding the plastic resin-carbonyl iron mixture to the desired shape.

Radio frequency assembly 105 comprises conductor 110 (which may be a microstrip or printed circuit conductor or a receiving antenna) mounted on base 112 (e.g., a ceramic plate or printed circuit board) and having conductor TO RECEIVER coupling conductor 110 to a receiver or other electronic apparatus (not shown), shield 120, 120' comprising metal powder loaded plastic material in accordance with the present invention and conductor 115 (which may be a microstrip or printed circuit conductor or a transmitting antenna) mounted on base 117 (e.g., a ceramic plate or printed circuit board) and having conductor TO TRANSMITTER coupling conductor 115 to a transmitter or other electronic apparatus (not shown).

In a first embodiment, shield 120' is placed between a pair of antennae such as conductors 110, 115 to shield conductors 110, 115 one from another and so to permit and facilitate concurrent operation of both of conductors 110, 115.

Figure 3:
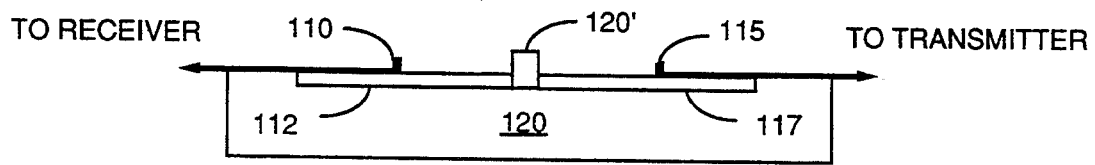
FIG. 3 is a side view, in section, taken along section lines 3—3 of FIG. 2, of a portion of a radio frequency assembly in accordance with the present invention.

FIG. 3 is a side view, in section, taken along section lines 3, 3 of FIG. 2, of portion 205 of radio frequency assembly 105 in accordance with the present invention. Portion 205 comprises receiving antenna 110 atop base 112, transmitting antenna 115 atop base 117, wherein bases 112, 117 are disposed atop and separated by radio frequency shield 120. Radio frequency shield 120 may comprise only portion 120' or may comprise radio frequency shield 120 or both as required for a specific application.

In a second embodiment, shield 120 coats at least a surface of base 112 and/or base 117 and shields conductors such as conductor 110 and/or conductor 115, which may be disposed on opposite sides of base 112 and/or base 117 as shield 120 (as illustrated in FIG. 3) or which may be disposed on a same side thereof (not shown). Shield 120 allows both conductors 110 and 115 to operate simultaneously while maintaining high DC and RF isolation of one from the other.

Alternatively, a plastic loaded with conductive particles in accordance with the present invention may be employed to "pot" or encapsulate an electronic assembly to provide electromagnetic shielding of one portion of the assembly from another portion or to shield one or more portions from external sources of electromagnetic energy.

Protection of the potted portions from other deleterious or potentially deleterious influences (wetting, conductive materials, corrosion and the like) may also be provided by the same potting coating in addition to electromagnetic shielding provided thereby.

Thus, a radio frequency electromagnetic radiation absorber has been described which overcomes specific problems and accomplishes certain advantages relative to prior art methods and mechanisms. The improvements over known technology are significant. The expense, complexities, and high tooling costs of plasma preparation of carbonyl iron are avoided. Similarly, good radio frequency absorption properties are provided together with good DC insulation properties.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

We claim:

1. A method for preparing a plastic containing insulating metal powder particles, said method comprising steps of:
   placing the metal powder particles in a mixing container;
   adding a solution comprising a monomer dissolved in a solvent to the metal powder particles to form a mixture;
   stirring the mixture to provide an even consistency;
   baking the mixture to remove solvents;
   stirring the mixture to break the surface of the mixture;
   polymerizing the monomer;
   grinding the mixture to form a powder; and
   including the powder in a plastic matrix.

2. A method as claimed in claim 1, wherein said adding step includes a step of adding a solution of silicone rubber dissolved in a solvent and having a solids content of 10% or more, the solvent selected from the group consisting of hexane, toluene, acetone, isopropanol, ethanol, methanol and mineral spirits.

3. A method as claimed in claim 2, wherein said polymerizing step includes a step of treating the mixture with a gas having at least 40% relative humidity for a period of at least one-half of an hour.

4. A method as claimed in claim 1, wherein said placing step includes a step of placing carbonyl iron particles in a mixing container.

5. A method as claimed in claim 4, wherein said carbonyl iron particles have diameters less than six micrometers.

6. A method as claimed in claim 1, wherein said baking step includes a step of oven baking at a temperature of between 60 and 80 degrees Celsius for a period of more than forty-five minutes.

7. A method as claimed in claim 1, wherein said adding step includes a step of adding a solution of epoxy monomer dissolved in a solvent and having a solids content of 10% or more, the solvent selected from the group consisting of hexane, toluene, acetone, isopropanol, ethanol, methanol and mineral spirits.

8. An apparatus for radio frequency shielding comprising an insulating molded plastic, said molded plastic including in combination:
   a resin; and
   insulated metallic particles.

9. An apparatus as claimed in claim 8, wherein said insulated metallic particles comprise carbonyl iron particles.

10. An apparatus as claimed in claim 8, wherein said insulated metallic particles further comprise an insulating coating of polymerized monomer, said polymerized monomer having been dissolved in a solvent and thoroughly mixed with metallic particles, subsequently heated to remove said solvent and polymerized to provide said insulated metallic particles.

11. An apparatus as claimed in claim 9, wherein said carbonyl iron particles have diameters of less than six micrometers.

12. An apparatus as claimed in claim 10, wherein said polymerized monomer is polymerized by exposure to moist gas having a relative humidity of 40% or more for a period of at least an hour.

13. An apparatus as claimed in claim 10, wherein said polymerized monomer comprises silicone rubber.

14. An apparatus as claimed in claim 10, wherein said polymerized monomer comprises epoxy.

15. In a communications apparatus comprising a receiving antenna, a transmitting antenna and a shield separating said receiving antenna from electromagnetic energy radiated from said transmitting antenna, said shield comprising:
   insulated metal particles, wherein said insulated metal particles include an insulating coating; and
   a plastic matrix including said insulated metal particles.

16. A communications apparatus as claimed in claim 15, wherein said insulated metal particles comprise carbonyl iron particles.

17. A communications apparatus as claimed in claim 15, wherein said insulated metal particles comprise metal particles coated with a monomer which is then polymerized.

18. A communications apparatus as claimed in claim 17, wherein said monomer comprises a thermosetting plastic material.

19. A communications apparatus as claimed in claim 17, wherein said monomer comprises a thermoplastic material.

20. A communications apparatus as claimed in claim 15, wherein said plastic matrix comprises epoxy.

* * * * *